(12) United States Patent
Cook

(10) Patent No.: US 7,044,050 B1
(45) Date of Patent: May 16, 2006

(54) INDOOR BARBECUE SYSTEM

(76) Inventor: Willie Cook, 5319 W. Quincy St., Chicago, IL (US) 60644

( * ) Notice: Subject to any disclaimer, the term of this patent is extended or adjusted under 35 U.S.C. 154(b) by 0 days.

(21) Appl. No.: 11/093,985

(22) Filed: Mar. 31, 2005

(51) Int. Cl.
A47J 37/00 (2006.01)

(52) U.S. Cl. .......................................... 99/482; 99/481

(58) Field of Classification Search .................. 99/339, 99/340, 441, 467, 444–450, 476–479, 427; 126/25 R, 9 R, 59.5, 21 A; 426/314, 315, 426/233, 523
See application file for complete search history.

(56) References Cited

U.S. PATENT DOCUMENTS

| | | | | |
|---|---|---|---|---|
| 2,520,067 A | * | 8/1950 | Sagen | 99/420 |
| 3,974,760 A | * | 8/1976 | Ellis | 99/482 |
| 4,130,052 A | * | 12/1978 | Jacobson | 99/339 |
| 4,213,443 A | | 7/1980 | Morande, Jr. | |
| 4,510,854 A | * | 4/1985 | Robertson | 99/337 |
| 4,827,903 A | | 5/1989 | Kim | |
| 4,934,260 A | * | 6/1990 | Blevins | 99/482 |
| 5,404,801 A | | 4/1995 | Holland | |
| 5,473,979 A | * | 12/1995 | Ruben | 99/446 |
| 5,673,613 A | * | 10/1997 | Price | 99/482 |
| 5,711,209 A | | 1/1998 | Guines | |
| 5,762,985 A | * | 6/1998 | Eisele | 426/315 |
| 5,913,967 A | * | 6/1999 | Eisele | 99/468 |
| 6,038,964 A | * | 3/2000 | Sikes | 99/340 |
| 6,050,177 A | * | 4/2000 | Lassig, Jr. | 99/340 |
| D430,776 S | | 9/2000 | Pai | |
| D436,796 S | | 1/2001 | Kalina et al. | |
| 6,644,178 B1 | * | 11/2003 | Clark | 99/482 |
| 6,708,604 B1 | * | 3/2004 | Deichler, Jr. | 99/482 |
| 2004/0089163 A1 | | 5/2004 | Elwedini | |

* cited by examiner

Primary Examiner—Timothy F. Simone

(57) ABSTRACT

A barbecue system includes a housing including a plurality of monolithically formed side walls sized and shaped for defining a cooking cavity therebetween. The housing further includes a plurality of rigid support legs attached to a bottom one of the side walls. The support legs are outwardly canted at an oblique angle from the housing. The barbecue system further includes a mechanism for withdrawing heat and smoke from the cavity in such a manner that ambient air and ambient temperature within the enclosed environment can remain substantially smoke-free and heat-free during cooking operations and a mechanism for supplying heat into the cavity. A mechanism for disseminating an artificially-flavored air stream is also included. The disseminating mechanism is positioned vertically above the heat supplying mechanism and a cooking platform is registered above the disseminating mechanism.

18 Claims, 3 Drawing Sheets

INDOOR BARBECUE SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to food cooking systems and, more particularly, to an indoor barbecue system.

2. Prior Art

Outdoor barbecuing is a popular method of cooking and preparing various foods such as meats, poultry, fish and vegetables. This popularity is largely due to the unique flavor imparted to the food by the barbecuing process, which is often referred to as "barbecue", "smoke" or "charcoal" flavor, and also due to the fact that barbecuing is a relatively simple way of preparing such food.

Outdoor barbecuing is normally dependent on the weather and usually limited to the warmer months of the year. In addition, most people living in condominiums or apartments are prohibited from barbecuing on their balconies. Conventional barbecues are not intended for indoor use due to the heavy smoke and gaseous combustion by-products that are given off.

Many indoor barbecues have been developed in an attempt to provide the smell, taste and look of barbecue food without substantial production of heavy smoke and gaseous combustion by-products. For example, electric indoor barbecues provide one method of safely barbecuing indoors. Many of these designs include electric hotplates with grill-like surfaces for conveying a grill-like look to the food. Most electric indoor barbecues do not impart the traditional outdoor barbecue flavor to food.

Most indoor barbecues substitute lava rock or other suitable heat retentive material for charcoal briquettes or combustible material. The lava rock, heated from below either by an electric or a gas burner, cooks the food in much the same manner as burning charcoal briquettes, but without the production of noxious fumes and ash residue. These barbecues, however, fail to impart the traditional barbecue flavor to food.

Much of the heavy smoke and gaseous combustion by-products produced during barbecuing is the result of fat dripping from the food onto the hot briquettes. Since the amount of fat drippings differs among various foods, the amount of smoke emanating from the heating elements is often difficult to control and can quickly spoil the charm of indoor barbecuing. To address this particular disadvantage, filtration elements have been incorporated into smoke exhaust systems mounted atop a barbecue hood. These types of barbecues are somewhat complicated and may not be suitable for ordinary indoor use.

Accordingly, a need remains for an indoor barbecue that imparts a barbecue flavor to food and, at the same time, obviates or mitigates at least some of the shortcomings of the prior art. The present invention satisfies such a need by providing an indoor barbecue system that allows a user to enjoy the smoke-flavored taste of an outdoor barbecue from inside their home. Such a barbecue system allows tenants of apartments, condos, and townhouses to cook indoors without worrying about smoke or gas build up. It also allows homeowners to barbecue in the winter months, when it may be to cold to do so outside, thus enabling such users to enjoy the benefits of smoke flavored food year round.

BRIEF SUMMARY OF THE INVENTION

In view of the foregoing background, it is therefore an object of the present invention to provide a barbecue system employable within an enclosed environment. These and other objects, features, and advantages of the invention are provided by a barbecue system including a housing including a plurality of monolithically formed side walls sized and shaped for defining a cooking cavity therebetween. A front one of the side walls has an opening formed in such a manner that an operator can selectively place foodstuff within the cavity during cooking operations. A top one of the side walls has an oblique outer surface defining a dome provided with a centrally registered apex having an exit aperture formed therein.

The housing further includes a plurality of rigid support legs attached to a bottom one of the side walls for maintaining the housing at an elevated position above a ground surface and an access door pivotally connected to the front side wall in such a manner that the operator can effectively articulate the access door about a horizontally aligned fulcrum axis extending across a width of the front side wall opening and between raised and lowered positions respectively. The access door preferably includes an elongated hinge axially situated along the fulcrum axis. Such an access door may be provided with a transparent window centrally conjoined thereto so that the operator can maintain continuous visual contact with the cavity when standing exterior of the housing. The access door preferably further includes a plurality of handles secured to a top lip of the access door for assisting the operator to adapt the access door between the raised and lowered positions. The support legs are preferably outwardly canted at an oblique angle from the housing.

The barbecue system further includes a mechanism for withdrawing heat and smoke from the cavity in such a manner that ambient air and ambient temperature within the enclosed environment can remain substantially smoke-free and heat-free during cooking operations. The withdrawing mechanism extends outwardly and away from the housing and leads directly to an opening formed in an exterior wall structure such that heat and smoke byproducts can be effectively discharged exterior of the enclosed environment.

The barbecue system further includes a mechanism for supplying heat into the cavity and a mechanism for disseminating an artificially-flavored air stream such that the air stream saturates the cavity and impregnates the foodstuff during cooking operations. The disseminating mechanism is positioned vertically above the heat supplying mechanism and a cooking platform is registered above the disseminating mechanism in such a manner that the air stream passes upwardly through the foodstuff supported on the cooking platform prior to exiting the housing via the withdrawing mechanism.

The heat supplying mechanism and the withdrawing mechanism are independently operable during cooking operations such that the operator can effectively smoke the foodstuff without employing the heat supplying mechanism after the cavity has reached a predetermined temperature threshold and the disseminating mechanism has effectively saturated the cavity respectively.

The withdrawing mechanism includes an exhaust conduit operably conjoined to the exit opening and in fluid communication with the cavity. The exhaust conduit has first and second end portions wherein the first end portion is securely coupled to the housing. A power fan assembly is operably attached to the second end portion of the exhaust conduit and includes a cage nested within the wall structure of the enclosed environment and further includes a rotary blade nested within the cage wherein the smoke and the heat are extracted therethrough during operating conditions. The heat supplying mechanism includes a gas inlet passing through a lower portion of the housing and a burner operably mated to the gas inlet and spanning across a bottom surface of the housing.

The disseminating mechanism includes a tray having monolithically formed side walls for defining a substantially planar bottom surface and upwardly protruding edges. The tray is sized and shaped so that the operator can selectively remove the tray from the housing while the cooking platform remains nested within the housing. A plurality of flavored pellets may be removably situated within the tray and are heat-activated for releasing a selected aroma upwardly towards the cooking platform.

The cooking platform preferably includes a drip pan sized and shaped for spanning across an entire width of the disseminating mechanism while being freely removably from the housing through the front side wall opening. A grill surface may be removably positioned on top of the drip pan in such a manner that the drip pan collects undesirable foodstuff byproducts for effectively sheltering the disseminating mechanism during cooking operations.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
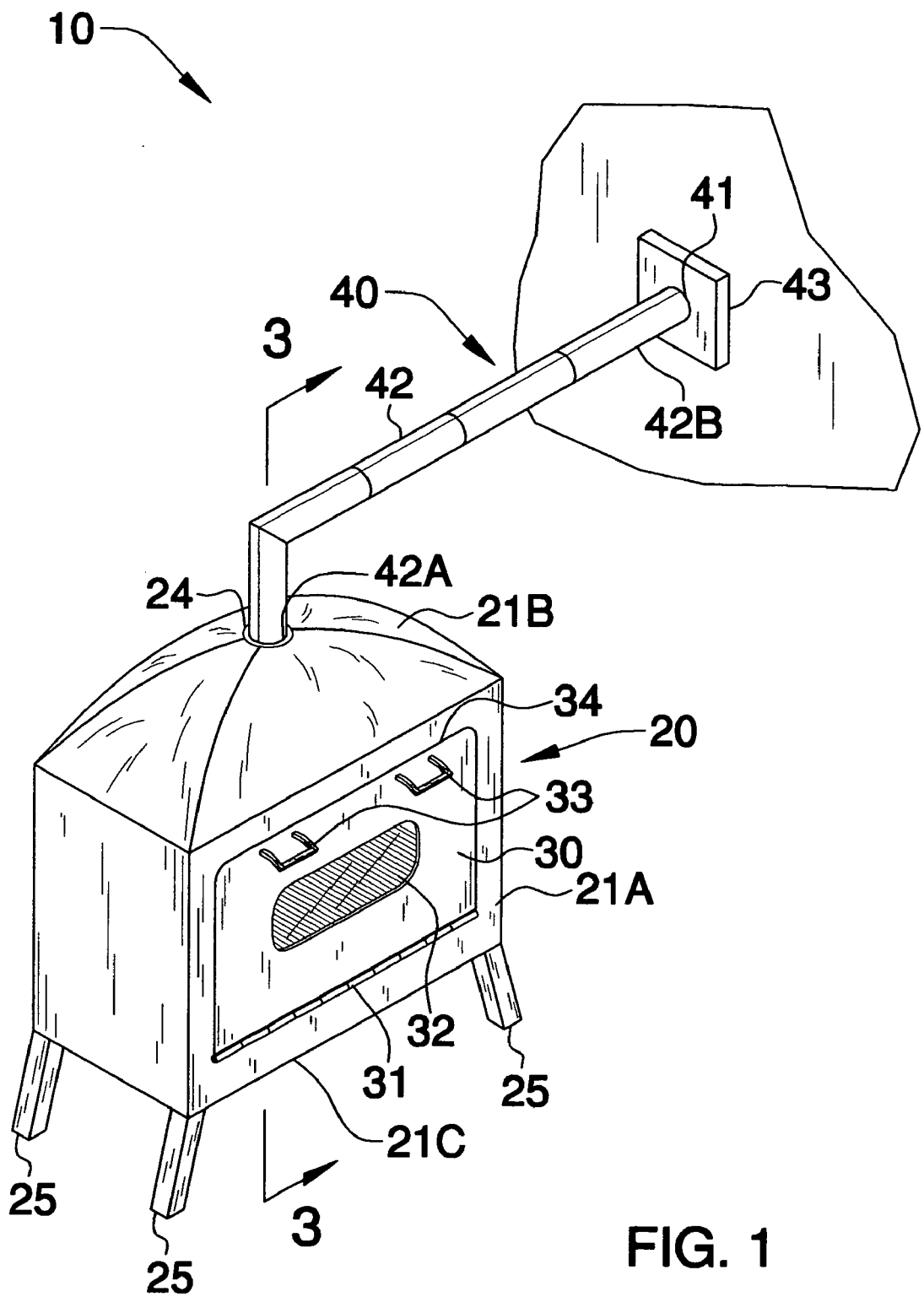
FIG. 1 is a perspective view showing an indoor barbecue system, in accordance with the present invention.
Figure 2:
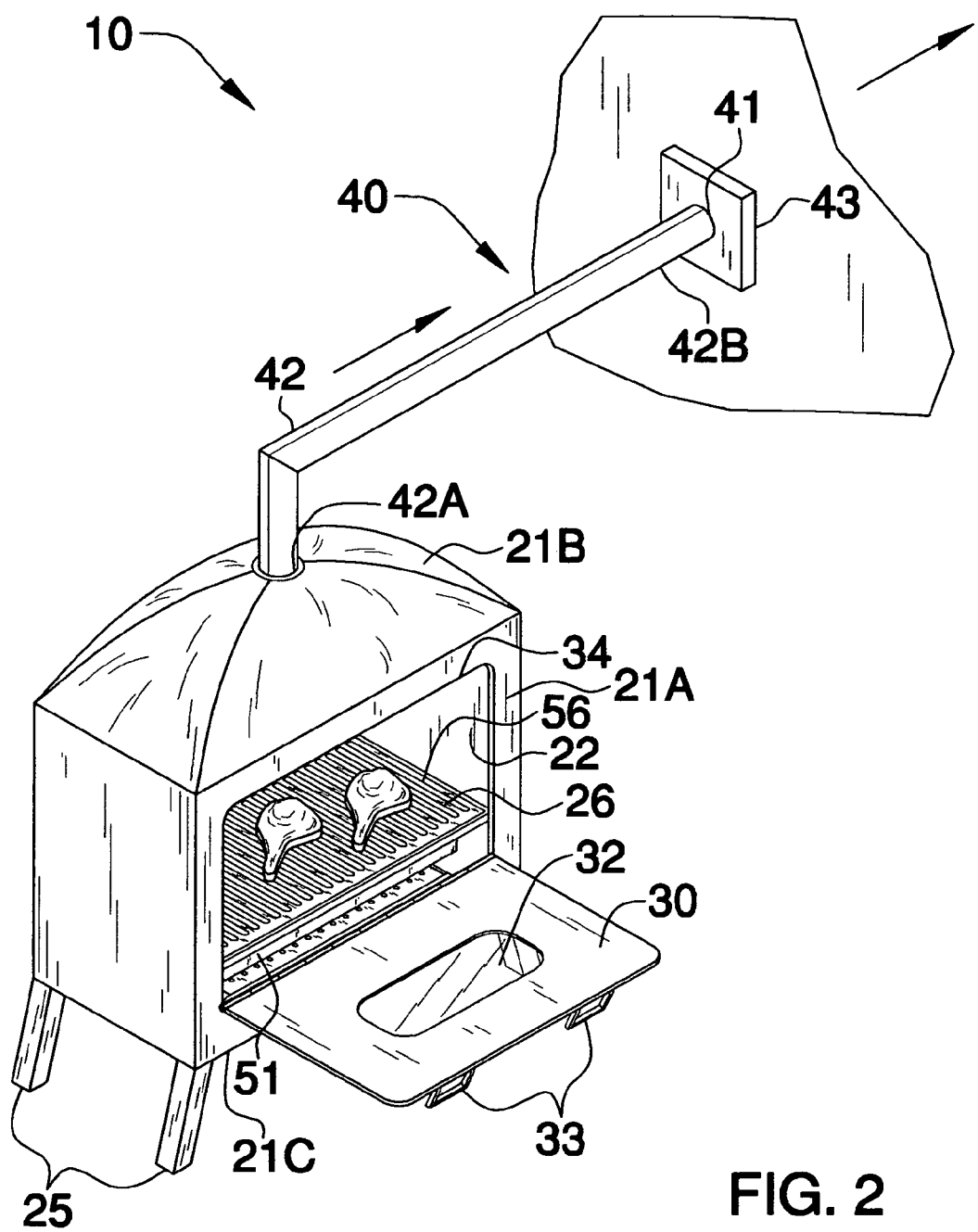
FIG. 2 is a perspective view of the barbecue system shown in FIG. 1, showing the access door at an open position and illustrating the withdrawing mechanism.
Figure 3:
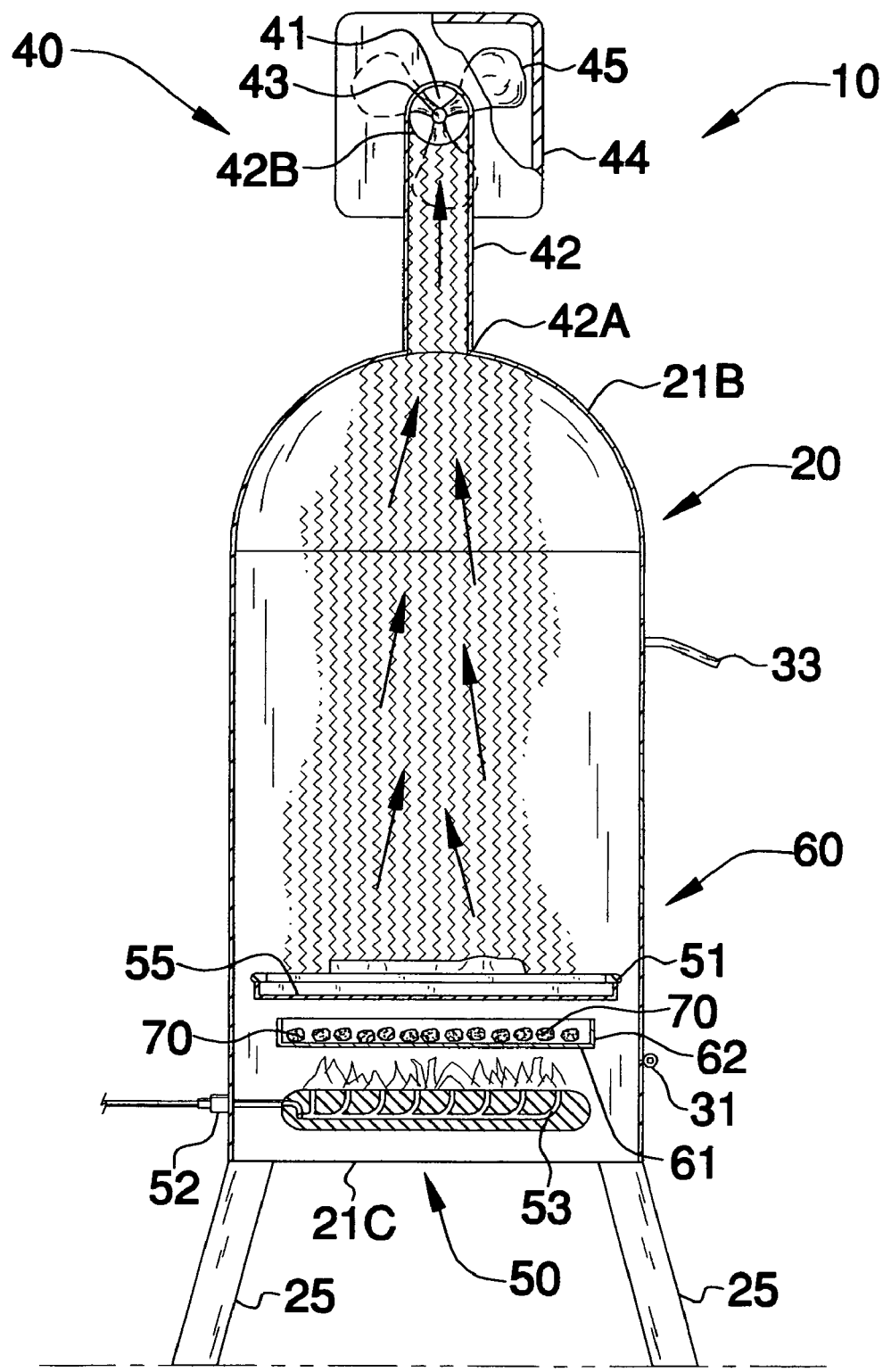
FIG. 3 is a cross-sectional view of the barbecue system shown in FIG. 1, taken along line 3—3.

The apparatus of this invention is referred to generally in FIGS. 1–3 by the reference numeral 10 and is intended to provide an indoor barbecue system. It should be understood that the barbecue system 10 may be used to cook many different types of foodstuff and should not be limited in use to cooking only conventional barbecue items, such as steak, chicken and fish.

Referring initially to FIG. 1, the barbecue system 10 includes a housing 20 including a plurality of monolithically formed side walls 21 sized and shaped for defining a cooking cavity 22 therebetween, as shown in FIG. 2. Such a housing 20 is preferably large enough to accommodate a large roast, turkey or other large items. A front one 21A of the side walls 21 has an opening 26 formed in such a manner that an operator can selectively place foodstuff within the cavity 22 during cooking operations, as again shown in FIG. 2. A top one 21B of the side walls 21 has an oblique outer surface defining a dome provided with a centrally registered apex having an exit aperture 24 formed therein. The exit aperture 24 allows smoke and combustible gases to be easily removed from the housing 20 and exhausted to the exterior of a building, thereby prevent smoke inhalation and smell problems therein.

The housing 20 further includes a plurality of rigid support legs 25 attached to a bottom one 21C of the side walls 21 for maintaining the housing 20 at an elevated position above a ground surface. Of course, such support legs 25 may include a plurality of wheels attached thereto for transporting the barbecue system 10 between remote locations, as is well known in the industry. An access door 30 is pivotally connected to the front side wall 21A in such a manner that the operator can effectively articulate the access door 30 about a horizontally aligned fulcrum axis extending across a width of the front side wail opening 26 and between raised and lowered positions respectively.

The access door 30 includes an elongated hinge 31 axially situated along the fulcrum axis. Such a hinge 31 preferably extends along the entire length of the fulcrum axis so the access door 30 remains tightly closed when at a raised position, thereby preventing the escape of smoke or gas from within the housing 20 during operating conditions. Such an access door 30 may be provided with a transparent window 32 centrally conjoined thereto so that the operator can maintain continuous visual contact with the cavity 22 when standing exterior of the housing 20. Such a window 32 may also include a thermometer attached thereto for monitoring the temperature inside the housing 20, as is well known in the industry. The access door 30 preferably further includes a plurality of handles 33 secured to a top lip 34 of the access door 30 or assisting the operator to adapt the access door 30 between the raised and lowered positions. The support legs 25 may be outwardly canted at an oblique angle from the housing 20 in order to provide a stable cooking surface.

Referring to FIGS. 1 and 2, the barbecue system 10 further includes a mechanism 40 for withdrawing heat and smoke from the cavity in such a manner that ambient air and ambient temperature within the enclosed environment can remain substantially smoke-free and heat-free during cooking operations. The withdrawing mechanism 40 extends outwardly and away from the housing 20 and leads directly to an opening 41 formed in an exterior wall structure such that heat and smoke byproducts can be effectively discharged exterior of the enclosed environment.

The operation of the withdrawing mechanism is similar to the venting of conventional clothes dryers in that heated air is exhausted to an external environment. In some environments, it may be possible to adapt the barbecue system 10 to an already existing dryer vent system, thereby eliminating the need to form another opening in an exterior wall and saving time and money as well as adding convenience. Such a mechanism 40 allows the barbecue system 10 to be used during the entire course of a year, even in cold climates. It also enables the barbecue system 10 to be used in less traditional locations, such as a garage or basement, where conventional outdoor grills can not be used.

Referring to FIG. 3, the barbecue system 10 further includes a mechanism 50 for supplying heat into the cavity and a mechanism 60 for disseminating an artificially-flavored air stream such that the air stream saturates the cavity 22 and impregnates the foodstuff during cooking operations. The disseminating mechanism 60 is positioned vertically above the heat supplying mechanism 50 and a cooking platform 51 is registered above the disseminating mechanism 60 in such a manner that the air stream passes upwardly through the foodstuff supported on the cooking platform 51 prior to exiting the housing 20 via the withdrawing mechanism 40. The heat supplying mechanism 50 and the withdrawing mechanism 40 are independently operable during cooking operations such that the operator can effectively smoke the foodstuff without employing the heat supplying mechanism 50 after the cavity 22 has reached a predetermined temperature threshold and the disseminating mechanism 60 has effectively saturated the cavity 22 respectively. Such a feature enables a user to add flavor and taste to a foodstuff without burning or overcooking it.

Referring to FIG. 3, the withdrawing mechanism 40 includes an exhaust conduit 42 operably conjoined to the exit opening 41 and in fluid communication with the cavity 22. The exhaust conduit 42 has first 42A and second 42B end portions wherein the first end portion 42A is securely coupled to the housing 20. A power fan assembly 43 is operably attached to the second end portion 42B of the exhaust conduit 42 and includes a cage 44 nested within the wall structure of the enclosed environment and further includes a rotary blade 45 nested within the cage 44 wherein the smoke and the heat are extracted therethrough during operating conditions. The fan assembly 43 ensures that the smoke and heat is quickly and efficiently exhausted so it does not build up inside the housing 20, ruining the flavor of the foodstuff and causing it to be more dry than desired. The heat supplying mechanism 50 includes a gas inlet 52 passing through a lower portion of the housing 20 and a burner 53 operably mated to the gas inlet 52 and spanning across a bottom surface of the housing 20. Such a gas inlet preferably provides natural gas, butane gas, or propane, for fuel as is well known in the industry.

Again referring to FIG. 3, the disseminating mechanism 60 includes a tray 61 having monolithically formed side walls 62 for defining a substantially planar bottom surface 63 and upwardly protruding edges. The tray 61 is sized and shaped so that the operator can selectively remove the tray from the housing 20 while the cooking platform 51 remains nested within the housing 20. A plurality of flavored pellets 70 may be removably situated within the tray 61 and are heat-activated for releasing a selected aroma upwardly towards the cooking platform 51. The pellets 70 may have a hickory, mesquite or other flavor, as is obvious to one having ordinary skill in the art.

Still referring to FIG. 3, the cooking platform 51 preferably includes a drip pan 55 sized and shaped for spanning across an entire width of the disseminating mechanism 60 while being freely removably from the housing 20 through the front side wall opening 26. Such a drip pan 55 prevents grease and fat drippings from reaching the heat supplying mechanism 50 and igniting, thereby creating excess smoke and flames that may burn the foodstuff or cook it unevenly. A grill surface 56 may be removably positioned on top of the drip pan 55 in such a manner that the drip pan 55 collects undesirable foodstuff byproducts for effectively sheltering the disseminating mechanism 60 during cooking operations, as shown in FIG. 2. This feature enables a user to easily clean and maintain the barbecue system 10, despite repeated and prolonged use.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A barbecue system employable within an enclosed environment, said barbecue system comprising:

a housing including a plurality of monolithically formed side walls sized and shaped for defining a cooking cavity therebetween, a front one of said side walls having an opening formed in such a manner that an operator can selectively place foodstuff within the cavity during cooking operations, a top one of said side walls having an oblique outer surface defining a dome provided with a centrally registered apex having an exit aperture formed therein, said housing further including a plurality of rigid support legs attached to a bottom one of said side walls for maintaining said housing at an elevated position above a ground surface, said housing further including an access door pivotally connected to said front side wall in such a manner that the operator can effectively articulate said access door about a horizontally aligned fulcrum axis extending across a width of said front side wall opening and between raised and lowered positions respectively;

means for withdrawing heat and smoke from the cavity in such a manner that ambient air and ambient temperature within the enclosed environment can remain substantially smoke-free and heat-free during cooking operations, said withdrawing means extending outwardly and away from said housing and leading directly to an opening formed in an exterior wall structure such that heat and smoke byproducts can be effectively discharged exterior of the enclosed environment;

means for supplying heat into the cavity;

means for disseminating an artificially-flavored air stream such that the air stream saturates the cavity and impregnates the foodstuff during cooking operations, said disseminating means being positioned vertically above said heat supplying means; and a cooking platform registered above said disseminating means in such a manner that the air stream passes upwardly through the foodstuff supported on said cooking platform prior to exiting said housing via said withdrawing means;

wherein said heat supplying means and said withdrawing means are independently operable during cooking operations such that the operator can effectively smoke the foodstuff without employing said heat supplying means after the cavity has reached a predetermined temperature threshold and said disseminating means has effectively saturated the cavity respectively.

2. The barbecue system of claim 1, wherein said withdrawing means comprises:

an exhaust conduit operably conjoined to the exit opening and in fluid communication with the cavity, said exhaust conduit having first and second end portions wherein said first end portion is securely coupled to said housing; and a power fan assembly operably attached to said second end portion of said exhaust conduit, said fan assembly including a cage nested within the wall structure of the enclosed environment and further including a rotary blade nested within said cage wherein the smoke and the heat are extracted therethrough during operating conditions.

3. The barbecue system of claim 1, wherein said heat supplying means comprises:

a gas inlet passing through a lower portion of said housing; and a burner operably mated to said gas inlet and spanning across a bottom surface of said housing.

4. The barbecue system of claim 1, wherein said disseminating means comprises:

a tray having monolithically formed side walls for defining a substantially planar bottom surface and upwardly protruding edges, said tray being sized and shaped so that the operator can selectively remove said tray from said housing while said cooking platform remains nested within said housing; and a plurality of flavored pellets removably situated within said tray, said pellets being heat-activated for releasing a selected aroma upwardly towards said cooking platform.

5. The barbecue system of claim 1, wherein said cooking platform comprises:

a drip pan sized and shaped for spanning across an entire width of said disseminating means while being freely removably from said housing through said front side wall opening; and a grill surface removably positioned on top of said drip pan in such a manner that said drip pan collects undesirable foodstuff byproducts for effectively sheltering said disseminating means during cooking operations.

6. The barbecue system of claim 1, wherein said access door comprises: an elongated hinge axially situated along the fulcrum axis.

7. A barbecue system employable within an enclosed environment, said barbecue system comprising:

a housing including a plurality of monolithically formed side walls sized and shaped for defining a cooking cavity therebetween, a front one of said side walls having an opening formed in such a manner that an operator can selectively place foodstuff within the cavity during cooking operations, a top one of said side walls having an oblique outer surface defining a dome provided with a centrally registered apex having an exit aperture formed therein, said housing further including a plurality of rigid support legs attached to a bottom one of said side walls for maintaining said housing at an elevated position above a ground surface, said housing further including an access door pivotally connected to said front side wall in such a manner that the operator can effectively articulate said access door about a horizontally aligned fulcrum axis extending across a width of said front side wall opening and between raised and lowered positions respectively, said access door being provided with a transparent window centrally conjoined thereto so that the operator can maintain continuous visual contact with the cavity when standing exterior of said housing;

means for withdrawing heat and smoke from the cavity in such a manner that ambient air and ambient temperature within the enclosed environment can remain substantially smoke-free and heat-free during cooking operations, said withdrawing means extending outwardly and away from said housing and leading directly to an opening formed in an exterior wall structure such that heat and smoke byproducts can be effectively discharged exterior of the enclosed environment;

means for supplying heat into the cavity;

means for disseminating an artificially-flavored air stream such that the air stream saturates the cavity and impregnates the foodstuff during cooking operations, said disseminating means being positioned vertically above said heat supplying means; and a cooking platform registered above said disseminating means in such a manner that the air stream passes upwardly through the foodstuff supported on said cooking platform prior to exiting said housing via said withdrawing means;

wherein said heat supplying means and said withdrawing means are independently operable during cooking operations such that the operator can effectively smoke the foodstuff without employing said heat supplying means after the cavity has reached a predetermined temperature threshold and said disseminating means has effectively saturated the cavity respectively.

8. The barbecue system of claim 7, wherein said withdrawing means comprises:

an exhaust conduit operably conjoined to the exit opening and in fluid communication with the cavity, said exhaust conduit having first and second end portions wherein said first end portion is securely coupled to said housing; and a power fan assembly operably attached to said second end portion of said exhaust conduit, said fan assembly including a cage nested within the wall structure of the enclosed environment and further including a rotary blade nested within said cage wherein the smoke and the heat are extracted therethrough during operating conditions.

9. The barbecue system of claim 7, wherein said heat supplying means comprises:
- a gas inlet passing through a lower portion of said housing; and
- a burner operably mated to said gas inlet and spanning across a bottom surface of said housing.

10. The barbecue system of claim 7, wherein said disseminating means comprises:
- a tray having monolithically formed side walls for defining a substantially planar bottom surface and upwardly protruding edges, said tray being sized and shaped so that the operator can selectively remove said tray from said housing while said cooking platform remains nested within said housing; and
- a plurality of flavored pellets removably situated within said tray, said pellets being heat-activated for releasing a selected aroma upwardly towards said cooking platform.

11. The barbecue system of claim 7, wherein said cooking platform comprises:
- a drip pan sized and shaped for spanning across an entire width of said disseminating means while being freely removably from said housing through said front side wall opening; and
- a grill surface removably positioned on top of said drip pan in such a manner that said drip pan collects undesirable foodstuff byproducts for effectively sheltering said disseminating means during cooking operations.

12. The barbecue system of claim 7, wherein said access door comprises:
- an elongated hinge axially situated along the fulcrum axis.

13. A barbecue system employable within an enclosed environment, said barbecue system comprising:
- a housing including a plurality of monolithically formed side walls sized and shaped for defining a cooking cavity therebetween, a front one of said side walls having an opening formed in such a manner that an operator can selectively place foodstuff within the cavity during cooking operations, a top one of said side walls having an oblique outer surface defining a dome provided with a centrally registered apex having an exit aperture formed therein, said housing further including a plurality of rigid support legs attached to a bottom one of said side walls for maintaining said housing at an elevated position above a ground surface, said housing further including an access door pivotally connected to said front side wall in such a manner that the operator can effectively articulate said access door about a horizontally aligned fulcrum axis extending across a width of said front side wall opening and between raised and lowered positions respectively, said access door being provided with a transparent window centrally conjoined thereto so that the operator can maintain continuous visual contact with the cavity when standing exterior of said housing, said access door further including a plurality of handles secured to a top lip of said access door for assisting the operator to adapt said access door between the raised and lowered positions, said support legs being outwardly canted at an oblique angle from said housing;
- means for withdrawing heat and smoke from the cavity in such a manner that ambient air and ambient temperature within the enclosed environment can remain substantially smoke-free and heat-free during cooking operations, said withdrawing means extending outwardly and away from said housing and leading directly to an opening formed in an exterior wall structure such that heat and smoke byproducts can be effectively discharged exterior of the enclosed environment;
- means for supplying heat into the cavity;
- means for disseminating an artificially-flavored air stream such that the air stream saturates the cavity and impregnates the foodstuff during cooking operations, said disseminating means being positioned vertically above said heat supplying means; and
- a cooking platform registered above said disseminating means in such a manner that the air stream passes upwardly through the foodstuff supported on said cooking platform prior to exiting said housing via said withdrawing means;
- wherein said heat supplying means and said withdrawing means are independently operable during cooking operations such that the operator can effectively smoke the foodstuff without employing said heat supplying means after the cavity has reached a predetermined temperature threshold and said disseminating means has effectively saturated the cavity respectively.

14. The barbecue system of claim 13, wherein said withdrawing means comprises:
- an exhaust conduit operably conjoined to the exit opening and in fluid communication with the cavity, said exhaust conduit having first and second end portions wherein said first end portion is securely coupled to said housing; and
- a power fan assembly operably attached to said second end portion of said exhaust conduit, said fan assembly including a cage nested within the wall structure of the enclosed environment and further including a rotary blade nested within said cage wherein the smoke and the heat are extracted therethrough during operating conditions.

15. The barbecue system of claim 13, wherein said heat supplying means comprises:
- a gas inlet passing through a lower portion of said housing; and
- a burner operably mated to said gas inlet and spanning across a bottom surface of said housing.

16. The barbecue system of claim 13, wherein said disseminating means comprises:
- a tray having monolithically formed side walls for defining a substantially planar bottom surface and upwardly protruding edges, said tray being sized and shaped so that the operator can selectively remove said tray from said housing while said cooking platform remains nested within said housing; and
- a plurality of flavored pellets removably situated within said tray, said pellets being heat-activated for releasing a selected aroma upwardly towards said cooking platform.

17. The barbecue system of claim 13, wherein said cooking platform comprises:
- a drip pan sized and shaped for spanning across an entire width of said disseminating means while being freelyremovably from said housing through said front side wall opening; and a grill surface removably positioned on top of said drip pan in such a manner that said drip pan collects undesirable foodstuff byproducts for effectively sheltering said disseminating means during cooking operations.

18. The barbecue system of claim 13, wherein said access door comprises: an elongated hinge axially situated along the fulcrum axis.

* * * * *